US 6,710,137 B2

(12) United States Patent
Matsumoto et al.

(10) Patent No.: US 6,710,137 B2
(45) Date of Patent: Mar. 23, 2004

(54) RESIN COMPOSITION FOR POWDER COATING, POWDER COATING, AND ARTICLE COATED THEREWITH

(75) Inventors: Akira Matsumoto, Osaka (JP); Tetsuro Agawa, Osaka (JP)

(73) Assignee: Dainippon Ink and Chemicals, Inc., Tokyo (JP)

(*) Notice: Subject to any disclaimer, the term of this patent is extended or adjusted under 35 U.S.C. 154(b) by 150 days.

(21) Appl. No.: 10/060,215

(22) Filed: Feb. 1, 2002

(65) Prior Publication Data

US 2002/0156226 A1 Oct. 24, 2002

(30) Foreign Application Priority Data

Feb. 6, 2001 (JP) .................................. P2001-029485
Feb. 15, 2001 (JP) .................................. P2001-038389

(51) Int. Cl.$^7$ .............................................. C08G 18/82
(52) U.S. Cl. ...................... 525/440; 525/454; 525/457; 106/287.25; 106/287.26; 428/423.1
(58) Field of Search ................ 525/440, 454, 525/457; 106/287.25, 287.26; 428/423.1

(56) References Cited

U.S. PATENT DOCUMENTS

| | | |
|---|---|---|
| 4,442,270 A | 4/1984 | Passmore et al. |
| 5,510,444 A | 4/1996 | Halpaap et al. |
| 5,554,692 A * | 9/1996 | Ross ........................... 525/124 |

FOREIGN PATENT DOCUMENTS

| | | |
|---|---|---|
| EP | 0 803 524 | 10/1997 |
| JP | 7-247448 | 9/1995 |
| JP | 9-71738 | 3/1997 |
| JP | 11-228676 | 8/1999 |
| WO | WO 99/32567 | 7/1999 |

* cited by examiner

*Primary Examiner*—James J. Seidleck
*Assistant Examiner*—Melanie Bissett
(74) *Attorney, Agent, or Firm*—Armstrong, Kratz, Quintos, Hanson & Brooks, LLP

(57) ABSTRACT

The present invention provides a resin composition for a powder coating, which can form a coating film having superior appearance, superior flexibility and superior weatherability while maintaining the storage stability of the coating, and to provide a powder coating and an article coated therewith. The resin composition comprises a polyester resin (A) having a hydroxyl group or having a hydroxyl group and an acid group, isophthalic acid accounting for 50 mol % or more of a polycarboxylic acid unit constituting the polyester resin; a crystalline polyurethane resin (B); and a curing agent (C-1) made of a compound having a functional group reactive with the hydroxyl group or a combination of a curing agent (C-1) made of a compound having a functional group reactive with the hydroxyl group and a curing agent (C-2) made of a compound having a functional group reactive with the acid group.

13 Claims, No Drawings

RESIN COMPOSITION FOR POWDER COATING, POWDER COATING, AND ARTICLE COATED THEREWITH

BACKGROUND OF THE INVENTION

1. Field of the Invention

The present invention relates to a resin composition for a powder coating, which is useful for applications such as building materials, metal products, and parts for automobiles, and also relates to a powder coating and an article coated therewith.

2. Description of Related Art

The demand for thermosetting powder coatings as coatings for the protection and decoration of household electric appliances, furniture made of steel, building materials, and parts for automobiles has rapidly increased because thermosetting powder coatings are less polluting and free from organic solvents, and are also superior in the physical properties of the coating film and are inexpensive compared with conventional solvent type coatings.

As powder coatings which are being practically used, for example, polyester resin powder coatings, epoxy resin powder coatings, and acrylic resin powder coatings are generally known. Among these powder coatings, polyester powder coatings are widely used because coated films of such polyester powder coatings have superior physical properties and are inexpensive.

When using this polyester resin, terephthalic acid is generally used as the main polycarboxylic acid component because the glass transition temperature must be raised in view of the storage stability. However, this polyester resin has had the problem that the resulting coating film has poor weatherability, for example, the coating film undergoes whitening, choking or severe gloss reduction in a very short period.

As a means for solving this problem, Japanese Unexamined Patent Application, First Publication No. Hei 9-71738 proposes a polyester resin for powder coating comprising isophthalic acid as an acid component. However, there is the problem that this powder coating can be used only for specific purposes which do not require physical properties such as flexibility of the coating film because the physical properties are adversely affected, although the weatherability of the coating film is markedly improved.

To solve the problems described above, (1) a method of using terephthalic acid in combination with isophthalic acid, and (2) a method of combining weatherability and flexibility of a coating film by polycondensation of isophthalic acid with an aliphatic dicarboxylic acid and an aliphatic glycol which are used in combination with isophthalic acid have been proposed. However, the method (1) has the problem that the physical properties such as the flexibility are degraded as the amount of the isophthalic acid relative to the terephthalic acid increases and, if the amount of isophthalic acid is small, good weatherability, which is a feature due to isophthalic acid is not exhibited, while the method (2) has the problem that a powder coating having a sufficient storage stability to be practical cannot be obtained, although the weatherability and the flexibility of the coating film are improved. Therefore, it has been difficult to obtain a polyester resin powder coating comprising isophthalic acid as a main acid component which produces a coating film having good flexibility and good weatherability.

Japanese Unexamined Patent Application, First Publication No. Hei 7-247448 does not actually disclose a composition for powder coating wherein a crystalline polyurethane resin and a polyester resin are used in combination. Although a crystalline polyester polyurethane resin containing isophthalic acid as a carboxylic acid component is disclosed, a polyester resin prepared from isophthalic acid as a raw material is not disclosed. Assuming that only a crystalline polyuretane resin prepared from isophthalic acid as a raw material is used, a coating film having good balanced performance cannot be obtained.

BRIEF SUMMARY OF THE INVENTION

Objects of the present invention are to provide a resin composition for a powder coating, which can form a coating film having superior appearance, superior flexibility and superior weatherability while maintaining the storage stability of the coating, and to provide a powder coating and an article coated therewith.

To overcome various problems, the present inventors have carried out intensive research and found that a composition for a powder coating, comprising a polyester resin, a carboxylic acid component constituting the polyester resin containing a specific amount of isophthalic acid as a component, a crystalline polyester polyurethane resin, and a curing agent which is reactive with a hydroxyl group, can form a coating film having superior appearance, superior flexibility and superior weatherability. Thus, the present invention was completed.

The present invention provides a resin composition for powder coating, comprising a polyester resin (A) having a hydroxyl group or having a hydroxyl group and an acid group, isophthalic acid accounting for 50 mol % or more of the polycarboxylic acid units constituting the polyester resin; a crystalline polyurethane resin (B); and a curing agent (C-1) made of a compound having a functional group reactive with the hydroxyl group or a combination of a curing agent (C-1) made of a compound having a functional group reactive with the hydroxyl group and a curing agent (C-2) made of a compound having a functional group reactive with the acid group. The present invention also provides a coated article obtained by coating a substrate with the powder coating and curing the coating film with heat.

The resin composition for the powder coating and the powder coating of the present invention are useful for applications such as automobile bodies, building materials, plastic products, and woodworking products because they are superior in appearance, flexibility and weatherability of the coating film while maintaining the storage stability of the coating film. The coated article of the present invention is superior in appearance, weatherability, flexibility, water resistance, moisture resistance, boiling water resistance, and corrosion resistance.

DETAILED DESCRIPTION OF THE INVENTION

The present invention will be described in detail.

First, the polyester resin (A) having a hydroxyl group or having a hydroxyl group and an acid group used in the present invention will be described.

The polyester resin (A) having a hydroxyl group or having a hydroxyl group and an acid group (hereinafter referred to as a polyester resin (A)) is in the form of a solid at normal temperature, and the polycarboxylic acid units constituting the resin contain isophthalic acid as an essential component.

The hydroxyl value of the polyester resin (A) is preferably within a range from 10 to 100 in view of the curability.

In view of the reactivity with the curing agent, primary hydroxyl groups preferably account for the half or more of the hydroxyl groups. In the case of secondary or tertiary hydroxyl groups, the physical properties of the cured coating film are less likely to be exhibited.

The acid value of the polyester resin (A) is not specifically limited, and is preferably from 10 to 100 because the crosslink density is enhanced, thereby to enhance the mechanical strength and to enhance the storage stability.

As used herein, the term "hydroxyl value" refers to the number of mg of potassium hydroxide required to neutralize the carboxylic acid which can be bonded to hydroxyl groups in 1 g of the resin by acetylation.

As used herein, the term "acid value" refers to the number of mg of potassium hydroxide required to neutralize the carboxylic acid groups in 1 g of the resin.

The glass transition temperature (hereinafter referred to as Tg) of the polyester resin (A) is not specifically limited, but is preferably 50° C. or higher, and particularly preferably 60° C. or higher.

Tg is based on the numerical value determined from a differential scanning calorimetry (DSC) curve obtained according to the conditions of JIS K7122.

The softening point of the polyester resin (A) is not specifically limited, but is preferably within a range from 80 to 150° C., and more preferably from 100 to 120° C., in view of the blocking resistance and smoothness of the coating film. When the softening point of the resin is within the above range, the blocking resistance is high and the smoothness of the coating film is excellent.

The number-average molecular weight of the polyester resin (A) is not specifically limited, but is preferably within a range from 1,000 to 10,000, and particularly preferably from 2,000 to 6,000, in view of the storage stability and the smoothness of the coating film.

The polycarboxylic acid units constituting the polyester resin (A) used in the present invention must contain 50 mol % or more of isophthalic acid, and 80 mol % or more of isophthalic acid is preferred so as to enable the coating film obtained from the resin composition for coating composition of the present invention to exhibit excellent weatherability. The isophthalic acid includes isophthalic acids in which the hydrogen atoms of the aromatic ring are replaced with alkyl groups, such as 4-methylisophthalic acid or 5-tert-butylisophthalic acid.

As the polycarboxylic acid unit, in addition to isophtalic acid, provided that the effects of the invention are not adversely affected, it is possible to used aromatic dicarboxylic acids such as terephthalic acid, naphthalenedicarboxylic acid, and phthalic (anhydride); alicyclic dicarboxylic acids such as hexahydroisophthalic acid, hexahydroterephthalic acid, hexahydrophthalic acid, and anhydride thereof, tetrahydrophthalic acid and anhydride thereof, 1,4-cyclohexanedicarboxylic acid and 1,3-cyclohexanedicarboxylic acid; aliphatic dibasic acids such as oxalic acid, succinic acid, adipic acid, azelaic acid, sebacic acid, dodecanoic diacid, and eicosanic diacid; unsaturated dicarboxylic acids such as maleic acid, fumaric acid, and itaconic acid; and trifunctional or polyfunctional carboxylic acids such as trimellitic acid, pyromellitic acid, and trimesic acid. These carboxylic acid units also include those which are reactive with an alcohol component such as anhydride or esterified article.

Typical examples of the polyhydric alcohol unit include neopentyl glycol, ethylene glycol, 1,3-propylene glycol, 1,2-propylene glycol, 2-methyl-1,3-propylene glycol, 1,4-butylene glycol, 1,3-butylene glycol, 1,6-hexanediol, diethylene glycol, dipropylene glycol, triethylene glycol, 1,4-cyclohexanedimethanol, ethylene oxide adduct of bisphenol A, propylene oxide adduct of bisphenol A, cyclohexanedimethanol, hydrogenated bisphenol A, ethylene oxide adduct of hydrogenated bisphenol A, propylene oxide adduct of hydrogenated bisphenol A, glycerin, trimethylolethane, trimethylolpropane, trishydroxymethylaminomethane, pentaerythritol, dipentaerythritol, and sorbitol. Among these compounds, neopentyl glycol is preferred in view of the weatherability of the coating film.

The polyester resin (A) can be prepared by a conventionally known reaction method such as an esterification reaction or a transesterification reaction. It can be prepared by a dehydration condensation reaction between a polycarboxylic acid and a polyhydric alcohol under heating conditions. In this case, the polycondensation can be accelerated by a method of raising the reaction temperature under pressure, a reduced pressure method or a method using a flow of an inert gas under normal pressure.

In the esterification reaction or transesterification reaction described above, the reaction can be accelerated using a conventionally known reaction catalyst such as di-n-butyltin oxide or antimony trioxide.

The method of introducing a hydroxyl group into the polyester resin (A) is not specifically limited, but examples thereof include a method of reacting the polycarboxylic acid and the polyhydric alcohol with an excess equivalent ratio of the hydroxyl groups relative to the carboxyl groups. The method of introducing a carboxyl group into the polyester resin (A) includes a method of reacting the polycarboxylic acid and the polyhydric alcohol with an excess equivalent ratio of the carboxyl groups relative to the hydroxyl groups and a method of a ring-opening addition reaction of an anhydride of a polycarboxylic acid.

Next, the crystalline polyurethane resin (B) used in the present invention will be described.

The term "crystalline" refers to the fact that a crystallization peak temperature is exhibited in a differential scanning calorimetry (DSC) curve obtained in accordance with the conditions defined in JIS K7121.

The crystallization peak temperature of the crystalline polyurethane resin (B) is not specifically limited, but is preferably within a range from 30 to 150° C., and particularly preferably from 50 to 150° C. When the crystallization peak temperature of the resin is within a range from 30 to 150° C., the powder coating is superior in storage stability, and melt-kneading in the preparation of the coating is easily carried out. Therefore, the above temperature ranges are preferred.

The crystallization peak temperature is based on a numerical value determined by the peak temperature of a differential scanning calorimetry (DSC) curve described in JIS K7121: Method for Measurement of Transition Temperature of Plastics.

The melt viscosity at 180° C. of the crystalline polyurethane resin (B) is not specifically limited, but is preferably 10 Pa·s or less, and particularly preferably from 0.005 to 1 Pa·s, in order to obtain a low viscosity at the curing temperature and good smoothness.

The crystalline polyurethane resin (B) preferably has a curing functional group, and particularly preferably an acid group and/or a hydroxyl group. Examples of the acid groups include a carboxyl group, a sulfonic acid group, and a phosphoric acid group. Among these acid groups, a carboxyl group is preferred in view of the water resistance of the coating film. When the crystalline polyurethane resin (B) has a curing functional group, it reacts with a curing agent (C-1) described hereinafter, which is made of a compound having a functional group reactive with the hydroxyl group or a curing agent (C-2) described hereinafter, which is made of a compound having a functional group reactive with the acid group to form a cured coating film having excellent performance of the coating film.

The crystalline polyurethane resin (B) may have functional groups such as isocyanate groups, silyl groups, or acid anhydride groups, in addition to the functional groups such as the acid groups and hydroxyl groups described above.

The acid value and hydroxyl value of the crystalline polyurethane resin (B) are not specifically limited, but the acid value is preferably within a range from 5 to 100, while the hydroxyl value is preferably within a range from 5 to 100, in view of the reactivity with the curing agent (C-1) or curing agent (C-2) and the mechanical properties of the coating film. It is particularly preferred that the total value of the acid value and the hydroxyl value is 50 or less.

The high-molecular weight polyol unit constituting the crystalline polyurethane resin (B) contains a polyesterpolyol and/or a polyether polyol as a main component, and is preferably a crystalline polyesterpolyol in view of the yellowing resistance and the weatherability of the coating film. Provided that the effects of the present invention are not adversely affected, acrylic polyol, epoxy polyol, polycarbonate polyol, polycaprolactone polyesterpolyol and polybutadiene polyol can be used, in addition to the polyols described above.

Examples of the polyesterpolyol include those obtained by esterifying a polycarboxylic acid and a low-molecular weight polyol by a conventional method. The number-average molecular weight of the polyesterpolyol is not specifically limited, but is preferably within a range from 500 to 10,000.

Typical examples of the polycarboxylic acid include aliphatic dibasic acids such as oxalic acid, succinic acid, adipic acid, azelaic acid, sebacic acid, dodecane diacid, and eicosane diacid; aromatic dicarboxylic acids such as terephthalic acid, isophthalic acid, phthalic acid, and 2,6-naphthalenedicarboxylic acid; alicyclic dicarboxylic acids such as 1,4-cyclohexanedicarboxylic acid, 1,3-cyclohexanedicarboxylic acid, hexahydrophthalic anhydride, and tetrahydrophthalic anhydride; and unsaturated dicarboxylic acids such as maleic acid, fumaric acid, and itaconic acid. Also a trifunctional or polyfunctional carboxylic acid such as trimellitic acid or pyromellitic acid, and a hydroxycarboxylic acid such as p-oxybenzoic acid or tartaric acid can be used in combination.

Among these polycarboxylic acids, straight-chain aliphatic dicarboxylic acids having an even number of from 2 to 22 carbon atoms are preferred because they can reduce the melt viscosity and control the crystallization peak temperature of the crystalline polyurethane. Among these dicarboxylic acids, those having 12 carbon atoms or fewer are particularly preferred and, specifically, oxalic acid, succinic acid and adipic acid are preferred. These polycarboxylic acid components also include those which are reactive with alcohol components such as anhydrides or esterified compounds.

Typical examples of the low-molecular weight polyol include ethylene glycol, 1,3-propylene glycol, 1,2-propylene glycol, 2-methyl-1,3-propylene glycol, 1,4-butylene glycol, 1,3-butylene glycol, 1,6-hexanediol, diethylene glycol, dipropylene glycol, neopentyl glycol, triethylene glycol, 1,4-cyclohexanediol, ethylene oxide adduct of bisphenol A, propylene oxide adduct of bisphenol A, cyclohexanedimethanol, hydrogenated bisphenol A, ethylene oxide adduct of hydrogenated bisphenol A, propylene oxide adduct of hydrogenated bisphenol A, glycerin, trimethylolpropane, trishydroxymethylaminoethane, pentaerythritol, dipentaerythritol, and sorbitol. Among these polyols, straight-chain aliphatic dicarboxylic acids having an even number of from 2 to 20 carbon atoms are preferred because they can reduce the melt viscosity and control the crystallization peak temperature of the crystalline polyurethane. Among these polyols, ethylene glycol, 1,4-butanediol and 1,6-hexanediol are particularly preferred.

The polyisocyanate unit of the crystalline polyurethane resin (B) will now be described.

Typical examples of the polyisocyanate unit include polymethylenepolyphenyl isocyanate, diphenylmethane diisocyanate, tolylene diisocyanate, triphenylmethane triisocyanate, tetramethylene diisocyanate, hexamethylene diisocyanate, trimethylhexamethylene diisocyanate, isophorone diisocyanate, and lysine diisocyanate. Also, reaction products of these diisocyanates and difunctional or polyfunctional polyols, and isocyanurate compounds of these diisocyanates can be used. Among these polyisocyanate units, diisocyanate is preferred because it can reduce the melt viscosity and control the crystallization peak temperature of the crystalline polyurethane, and hexamethylene diisocyanate is particularly preferred.

The crystalline polyurethane resin (B) used in the present invention can be prepared by a conventionally known reaction method such as the so-called one-shot method or the prepolymer method.

The crystalline polyurethane resin (B) can be obtained by reacting the polyesterpolyol and/or polyether polyol with the polyisocyanate, or reacting the polyesterpolyol and/or polyether polyol with the polyisocyanate to form a urethane prepolymer having a terminal isocyanate group and reacting the resulting urethane prepolymer with a chain extender such as an amine compound. In this case, a crystalline polyurethane resin can be obtained by appropriately controlling the presence or absence of the polyesterpolyol, the polyether polyol, the polyisocyanate and the chain extender, and by controlling the cooling rate after forming the resin.

The reaction of the polyesterpolyol and/or polyether polyol with the polyisocyanate is usually carried out at 100 to 200° C. with an excess equivalent ratio of the hydroxyl groups in the polyesterpolyol and/or polyether polyl relative to the isocyanate groups in the polyisocyanate. The use of the chain extender in the prepolymer method described above improves the concentration of urethane bonds in the polyurethane resin, thereby making it possible to control the crystallinity of the polyurethane resin.

Typical examples of the chain extender include low-molecular weight polyols such as ethylene glycol, 1,3-propylene glycol, 1,2-propylene glycol, 2-methyl-1,3-propylene glycol, 1,4-butylene glycol, 1,3-butylene glycol, 1,6-hexanediol, diethylene glycol, dipropylene glycol, neopentyl glycol, and triethylene glycol; polyethers such as polytetramethylene glycol; and diamines such as hexamethylenediamine.

The introduction of a carboxyl group into the crystalline polyurethane resin (B) can be carried out by using a method allowing a carboxyl group to remain in the preparation of a polyesterpolyol using a carboxyl group-containing polyhydric alcohol as a polyhydric alcohol, a method of esterifying a hydroxyl group remaining in a polyurethane resin after the completion of the urethanation reaction with a polycarboxylic acid, or a method of effecting a ring-opening reaction between the remaining hydroxyl groups and a carboxylic anhydride.

The introduction of a hydroxyl group into the crystalline polyurethane resin (B) is not specifically limited, but includes a method of method of reacting the polyesterpolyol and the polyisocyanate with an excess equivalent ratio of the hydroxyl groups relative to the isocyanate groups.

The weight ratio of the polyester resin (A) to the crystalline polyurethane resin (B), (A)/(B), is not specifically limited, but is preferably within a range from 99/1 to 70/30 in order to achieve the effects of the present invention.

Next, the curing agent (C-1) made of a compound having a functional group reactive with a hydroxyl group (hereinafter referred to as a curing agent (C-1)) will be described.

The curing agent (C-1) includes, for example, polyisocyanate compounds and amino compounds. Typical examples of the polyisocyanate compound include various polyisocyanate compounds, for example, organic diisocyanates such as aliphatic diisocyanates (e.g. hexamethylene diisocyanate and trimethylhexamethylene diisocyanate), cyclic diisocyanates (e.g. xylylene diisocyanate and isophorone diisocyanate), and aromatic diisocyanates (e.g. 4,4'-diphenylmethane diisocyanate); adducts of these organic diisocyanates with polyhydric alcohol, low-molecular weight polyester resin such as polyesterpolyol, and water; and isocyanurate type polyisocyanate compound and isocyanate biuret compound obtained by polymerizing the above organic diisocyanates. Among these compounds, a blocked polyisocyanate is preferred in view of the storage stability and curability at low temperatures of the resin composition.

Typical examples of the blocked polyisocyanate compound include those obtained by blocking the polyisocyanate compound using a conventionally known blocking agent such as lactam or oxime. Examples of the commercially available product of the blocked polyisocyanate include VESTANAT B1358/100, VESTAGON B1065 and VESTAGON B1530 (all of which are manufactured by Degussa Hules of Germany), and Crelan UI and Crelan TPLS2122 (manufactured by SUMITOMO BAYER URETHANE CO., LTD.)

It is preferred to use a so-called self-blocked compound having a urethodione bond in a molecule among the blocked polyisocyanate compounds to prevent the blocking agent from being vaporized during curing.

Typical examples of these self-blocked polyisocyanates include VESTAGON BF1540 and VESTAGON EP-BF1300 (all of which are manufactured by Degussa Hules of Germany), and Crelan TPLS2147 (manufactured by SUMITOMO BAYER URETHANE CO., LTD.).

Examples of the amino compound include condensates obtained by reacting an amino group-containing compound such as melamine, urea or benzoguanamine with an aldehyde compound such as formaldehyde or glyoxazol by a known method. Typical examples of the etherified compound obtained by etherifying these condensates using alcohols include hexamethoxymethylmelamine "CYMEL 303" (manufactured by Mitsui Scitec Co., Ltd.) and "POWDER-LINK PL-1174" (manufactured by American Cyanamide).

With respect to the curing agent (C-1), the equivalent ratio of the functional groups of the curing agent (C-1) to the hydroxyl groups of the polyester resin (A) and the crystalline polyurethane resin (B), [{(A)+(B)}/(C)], is preferably within a range from 1.3/1.0 to 1.0/1.3.

Next, the curing agent (C-2) made of a compound having a functional group reactive with an acid group [hereinafter referred to as a curing agent (C-2)] will be described.

Examples of the compound having a functional group reactive with an acid group include compounds having a reactive group such as glycidyl group (epoxy group), hydroxyl group or amino group.

Specific examples thereof include acrylic resins having a glycidyl group, polyester resins having a glycidyl group, polyether resins having a glycidyl group, polyamide resins having a glycidyl group, polyolefin resins having a glycidyl group, or polyvinyl acetate resins having a glycidyl group; diglycidyl ether type epoxy resins, novolak type epoxy resins, or a dicyclopentadiene-modified type epoxy resins which have as their raw materials bisphenol A, bisphenol F, bisphenol S, biphenyl, or the like; compounds having a glycidyl group, such as triglycidyl isocyanurate, glycidyl (meth)acrylate, or neopentyl glycol diglycidyl ether; hydroxyl group-containing compounds such as β-hydroxyalkylamide, ethylene glycol, propylene glycol, or hexamethylene glycol; and amine compounds such as tetramethylenediamine or hexamethylenediamine. Among these compounds, the use of a glycidyl group-containing acrylic resin, β-hydroxyalkylamide, triglycidyl isocyanurate and a diglycidyl ether type epoxy resin of bisphenol A is preferred in view of the smoothness, processability and curability at low temperatures of the coating film. Among these compounds, the β-hydroxyalkylamide and glycidyl group-containing acrylic resin are particularly preferred.

Examples of the preferred β-hydroxyalkylamide used as the curing agent (C-2) include "Primid XL-552" (manufactured by EMS-CHEMIE in Switzerland).

Next, the glycidyl group-containing acrylic resin as one of the preferably used curing agents (C-2) will be described.

The softening point of the glycidyl group-containing acrylic resin is within a range from 50 to 130° C., and is preferably from 90 to 120° C. When the softening point is within the above range, the storage stability (blocking resistance) of the resulting powder coating is good and the smoothness of the coating film is excellent.

The number-average molecular weight of the glycidyl group-containing acrylic resin is within a range from 300 to 10,000, and preferably from 1,000 to 5,000. When the number-average molecular weight is within the above range, the coating film is superior in mechanical properties and smoothness. Therefore, the above ranges are preferred.

The amount of the glycidyl (meth)acrylate in the glycidyl group-containing acrylic resin is preferably within a range from 10 to 100% by weight, and particularly preferably from 15 to 90% by weight. An amount within the above range is preferred because the coating film will have sufficient mechanical strength.

The method of preparing the glycidyl group-containing acrylic resin is not specifically limited and various conventionally known methods can be used. Examples thereof include a method of the radical polymerization reaction of the above monomers having an ethylenically unsaturated double bond in a solution of an organic solvent, followed by desolvation to obtain a desired polymer. This method is preferred because it is easy to control the molecular weight.

Although the amount of the curing agent reactive with an acid group is not specifically limited, the equivalent ratio of the functional groups of the curing agent (C-2) to the acid groups of the polyester resin (A) and, if necessary, the crystalline polyurethane resin (B), [{(A)+(B)}/(C)], is preferably within a range from 1.3/1.0 to 1.0/1.3.

The powder coating using a resin composition for the powder coating of the present invention has a wide range of applications such as household electric appliances, building materials, metal products, and parts for automobiles because it is superior in smoothness, mechanical properties and weatherability of the coating film and contains a blocked isocyanate compound as a curing agent (C-1) and also has improved storage stability when a curing agent (C-2) is additionally used, if necessary.

Next, the powder coating of the present invention will be described in detail.

The powder coating of the present invention contains a resin composition for powder coating and a surface modifier. If necessary, additives such as curing agents, which are different from those in the above resin composition, epoxy resins, pigments, curing accelerators, surface modifiers, blocking inhibitors, ultraviolet absorbers, and antioxidants can be appropriately added.

To prepare a powder coating of the present invention using the resulting resin composition for powder coating, various conventionally known methods can be directly employed.

Examples of the conventionally known methods include a method of mixing the resin composition for powder coating with the additives, melt-kneading the mixture and grinding the resulting solid coating and a method of preparing using a so-called mechanical grinding system. Although other methods can also be used, the methods described above are preferred because of their simplicity and ease of execution.

The powder coating of the present invention can be applied, for example, to coatings for automobile bodies and parts for automobiles; two-wheeled vehicles and parts for two-wheeled vehicles; various building materials such as gates and fences; various materials for building interiors and exteriors, such as aluminum sashes; materials of iron or non-iron metals, such as aluminum wheels; and plastic products, and various woodworking products, because it is superior in smoothness, mechanical properties and weatherability of the coating film.

Next, the coated article obtained by using the powder coating of the present invention will be described.

The coated article of the present invention is composed of a cured coating film formed by coating a substrate with the powder coating thus obtained by various conventionally known methods and curing by heating (baking), and the substrate.

Examples of the method of coating the substrate with the powder coating include the electrostatic powder coating method, the frictional electrification method, and the fluidizing coating method.

The coating film is preferably cured by heating (baking) in a drying oven at 140 to 210° C. for about 20 to 60 minutes.

The thickness of the coating film is not specifically limited, but is preferably within a range from about 30 to 150 μm, and particularly preferably from about 50 to 100 μm.

Typical examples of the substrate include various metal materials or metal products such as aluminum, stainless steel, chromium plating, galvanized iron sheets, and tin plates; roofing tiles; glasses; various inorganic building materials; heat-resistant plastics; and lumber. Specific examples thereof include automobile bodies and parts for automobiles; two-wheeled vehicles and parts for two-wheeled vehicles; various building materials such as gates and fences; various materials for building interiors and exteriors, such as aluminum sashes; materials of iron or non-iron metals, such as aluminum wheels; and plastic products and various woodworking products. Those subjected to surface treatments such as chemical treatment, zinc phosphating treatment and chromate treatment, and those subjected to electrodeposition coating are also included.

EXAMPLES

The following Reference Examples, Examples, and Comparative Examples further illustrate the present invention in detail, however, the present invention is not limited to these Examples. In the following Examples, parts and percentages are by weight unless otherwise specified. The characteristic values of the Reference Examples were measured or evaluated by the following methods.

Hydroxyl Value:
  A polyester resin sample and a crystalline polyurethane resin sample obtained in the Examples described hereinafter were dissolved in a mixed solution of acetic anhydride and pyridine and heated at reflux at 100° C. for one hour, thereby acetylating the hydroxyl groups, and deionized water was added, followed by heating to reflux, and then cooling. Then, the hydroxyl value was determined by back titration with a 0.5 N toluene/methanol solution of potassium hydroxide (unit: mg KOH/g).

Acid Value: (Unit: mg KOH/g)
  Polyester Resin (A):
    A crystalline polyurethane resin sample obtained in the Examples described hereinafter was dissolved in benzyl alcohol, and then the acid value was determined by titration with a 0.1 N potassium hydroxide-methanol solution.
  Crystalline Polyurethane Resin (B):
    A crystalline polyurethane resin sample obtained in the Examples described hereinafter was dissolved in cyclohexanone, and then the acid value was determined by titration with a 0.1 N potassium-hydroxide-methanol solution (unit: ° C.).

Crystallization Peak Temperature:
  Measured by using a DSC-3100 type scanning calorimeter (DSC) (manufactured by MAC Science Co., Ltd.) in accordance with JIS K7121 (unit: ° C.).

Glass Transition Temperature Tg:
  The differential scanning calorimetry method can be used. The glass transition temperature Tg can be obtained from the first inflection point at a heating rate of 10° C. per minute (unit: ° C.)

Melt Viscosity:
  Using a cone plate type viscometer CV-1S (manufactured by Toa Industry Co., Ltd.), the rotation speed of the cone CP-5 was set at 750 rpm. The melt viscosity was measured at a plate temperature of 180° C. (unit: Pa·s).

Softening Point:
  Using a ring and ball softening point measuring device (manufactured by Meihosha Factory Ltd.), a sample was heated in a heating bath of glycerin at a heating rate of 3° C./min, and then the temperature at which the sample begins to melt and the ball drops was measured (unit: ° C.).

Reference Examples 1 to 6 Preparation of Polyester Resin (A)

Reference Example 1

In a reaction vessel equipped with a stirrer, a thermometer, a rectifying column, and a nitrogen introducing inlet, 415 parts of neopentyl glycol, and 40 parts of trimethylolpropane were charged and then heated to 150° C. while stirring continuously in a nitrogen atmosphere. Furthermore, 695 parts of isophthalic acid and 0.5 parts of dibutyltin oxide were added and then heated to 240° C. The dehydration condensation reaction was continued at the same temperature to obtain a polyester resin having a hydroxyl value of 30, an acid value of 3 and a Tg as measured by differential scanning calorimetry of 62° C. The resulting polyester resin is referred to as "polyester resin (A-1)" hereinafter.

Reference Example 2

In a reaction vessel equipped with a stirrer, a thermometer, a rectifying column, and a nitrogen introducing inlet, 429 parts of neopentyl glycol and 30 parts of trimethylolpropane were charged and then heated to 150° C. while stirring continuously in a nitrogen atmosphere. Furthermore, 276 parts of terephthalic acid, 414 parts of isophthalic acid, and 0.5 parts of dibutyltin oxide were added and then heated to 240° C. The dehydration condensation reaction was continued at the same temperature to obtain a polyester resin having a hydroxyl value of 40, an acid value of 3 and a Tg as measured by differential scanning calorimetry of 62° C. The resulting polyester resin is referred to as "polyester resin (A-2)" hereinafter.

Reference Example 3

In a reaction vessel equipped with a stirrer, a thermometer, a rectifying column, and a nitrogen introducing inlet, 431 parts of neopentyl glycol and 25 parts of trimethylolpropane were charged and then heated to 150° C. while stirring continuously in a nitrogen atmosphere. Furthermore, 693 parts of terephthalic acid and 0.5 parts of dibutyltin oxide were added and then heated to 240° C. The dehydration condensation reaction was continued at the same temperature to obtain a polyester resin having a hydroxyl value of 30, an acid value of 3 and a Tg as measured by differential scanning calorimetry of 64° C. The resulting polyester resin is referred to as "polyester resin (A-3)" hereinafter.

Reference Example 4

In a reaction vessel equipped with a stirrer, a thermometer, a rectifying column, and a nitrogen introducing inlet, 420 parts of neopentyl glycol and 25 parts of trimethylolpropane were charged and then heated to 150° C. while stirring continuously in a nitrogen atmosphere. Furthermore, 483 parts of terephthalic acid, 207 parts of isophthalic acid, and 0.5 parts of dibutyltin oxide were added and then heated to 240° C. The dehydration condensation reaction was continued at the same temperature to obtain a polyester resin having a hydroxyl value of 30, an acid value of 3 and a Tg as measured by differential scanning calorimetry of 62° C. The resulting polyester resin is referred to as "polyester resin (A-4)" hereinafter.

Reference Example 5

In a reaction vessel equipped with a stirrer, a thermometer, a rectifying column, and a nitrogen introducing inlet, 415 parts of neopentyl glycol was charged and then heated to 150° C. while stirring continuously in a nitrogen atmosphere. Furthermore, 616.4 parts of isophthalic acid, 28.6 parts of adipic acid, and 0.5 parts of dibutyltin oxide were added and then heated to 240° C. The dehydration condensation reaction was continued at the same temperature to obtain a polyester resin having a hydroxyl value of 20, an acid value of 15 and a Tg as measured by differential scanning calorimetry of 57° C. The resulting polyester resin is referred to as "polyester resin (A-5)" hereinafter.

Reference Example 6

In a reaction vessel equipped with a stirrer, a thermometer, a rectifying column, and a nitrogen introducing inlet, 434.4 parts of neopentyl glycol and 7 parts of trimethylolpropane were charged and then heated to 150° C. while stirring continuously in a nitrogen atmosphere. Furthermore, 211.5 parts of terephthalic acid, 493.6 parts of isophthalic acid, and 0.5 parts of dibutyltin oxide were added and then heated to 240° C. The dehydration condensation reaction was continued at the same temperature to obtain a polyester resin having a hydroxyl value of 20, an acid value of 20 and a Tg as measured by differential scanning calorimetry of 63° C. The resulting polyester resin is referred to as "polyester resin (A-6)" hereinafter.

Reference Example 7

In a reaction vessel equipped with a stirrer, a thermometer, a rectifying column, and a nitrogen introducing inlet, 393.2 parts of neopentyl glycol and 34 parts of trimethylolpropane were charged and then heated to 150° C. while stirring continuously in a nitrogen atmosphere. Furthermore, 719.1 parts of terephthalic acid and 0.5 parts of dibutyltin oxide were added and then heated to 240° C. The dehydration condensation reaction was continued at the same temperature to obtain a polyester resin having a hydroxyl value of 15, an acid value of 30 and a Tg as measured by differential scanning calorimetry of 57° C. The resulting polyester resin is referred to as "polyester resin (A-7)" hereinafter.

Reference Examples 8 and 9 Preparation of Polyesterpolyol Used in Crystalline Polyurethane Resin In a reaction vessel equipped with a stirrer, a thermometer, a rectifying column, and a nitrogen introducing inlet, the polyol, and polycarboxylic acid raw compounds shown in Table 1 were charged in the amount shown in Table 1 and were then heated to 150° C. while stirring continuously in a nitrogen atmosphere.

Furthermore, 0.5 parts of dibutyltin oxide was added and then heated to 240° C., and then the dehydration condensation reaction was continued at the same temperature to obtain polyesterpolyols. The resulting polyesterpolyols are referred to as "polyesterpolyols (D-1) and (D-2)" hereinafter.

TABLE 1

|  |  | Reference Examples | |
|---|---|---|---|
| Items | | 8 | 9 |
| Name of polyesterpolyol | | D-1 | D-2 |
| Polyol (parts) | 1.4-BG [1] | 560.0 | |
| | EG [2] | | 450.0 |
| polycarboxylic acid (parts) | Succinic anhydride | 535.4 | 668.2 |
| Dibutyltin oxide | | 0.5 | 0.5 |
| Characteristics of resin | Hydroxyl value (mg KOH/g) | 100.0 | 70.0 |
| | Acid value (mg KOH/g) | 3.0 | 3.0 |

TABLE 1-continued

|  | Reference Examples | |
|---|---|---|
| Items | 8 | 9 |
| Appearance | opaque | opaque |
| Crystallization peak temperature (° C.) | 75 | 55 |

Notes for Table 1
[1] 1,4BG: 1,4-butanediol
[2] EG: ethylene glycol

Reference Examples 10 to 14 Preparation of Crystalline

Polyurethane Resin (B)

In a reaction vessel equipped with a stirrer, a thermometer, a rectifying column, and a nitrogen introducing inlet, a polyol and a polyester were charged in the amount shown in Table 2 and were then heated to 150° C. while stirring continuously in a nitrogen atmosphere.

After adding a chain extender and dibutyltin laurate as a urethanation catalyst, if necessary, a polyisocyanate was added over 2 hours, with attention given to heat generation, and the urethane reaction was carried out at the same temperature to obtain crystalline polyurethane resins (B). Furthermore, a polycarboxylic anhydride was added in the amount shown in Table 2 and the ring-opening addition reaction was carried out, thereby to introduce a carboxyl group (Reference Examples 13 and 14). The resulting compounds are referred to as "crystalline polyurethane resins (B-1) and (B-5)" hereinafter.

TBPO) was added dropwise over 4 hours and also, after the completion of the dropwise addition, the mixture was maintained at the same temperature for 10 hours.

After the completion of the polymerization reaction, xylene was distilled off by maintaining the resin solution thus obtained at 170° C. under a reduced pressure of about 30 Torr to obtain the objective glycidyl group-containing acrylic polymer (C) having a nonvolatile content of 99.5%, a softening point as measured by the ring and ball method of 110° C., an epoxy equivalent of 550 and a number-average molecular weight of 2,500 as a solid. The resulting polymer is referred to as "polymer (C-1)" hereinafter.

Examples 1 to 11 and Comparative Examples 1 to 8

Preparation of Resin Composition for Powder Coating, and Powder Coating

According to the formulations shown in Table 3 to Table 7, resin compositions for powder coatings were prepared. Each of these compositions was melt-kneaded at 90° C. using a "Co-Kneader PR-46" (single screw extruder, manufactured by Buss in Switzerland), ground, and then classified using a 200 mesh wire gauze to prepare powder coatings having an average particle size within a range from 30 to 40 µm. The resulting powder coatings are referred to as "P-1" to "P-11" and "P'-1" to "P'-8".

TABLE 2

|  |  | Reference Examples | | | | |
|---|---|---|---|---|---|---|
| Items | | 10 | 11 | 12 | 13 | 14 |
| Name of crystalline polyurethane resin | | B-1 | B-2 | B-3 | B-4 | B-5 |
| Polyesterpolyol (parts) | D-1 | 100 |  | 100 | 100 | 100 |
|  | D-2 |  | 100 |  |  |  |
| Polyisocyanate (parts) | Hexamethylene diisocyanate | 13 |  | 14.2 | 12.3 | 9.7 |
|  | Isophorone diisocyanate |  | 3.6 |  |  |  |
| Chain extender (parts) | 1,4-butanediol |  |  | 0.9 |  |  |
| Polycarboxylic acid for for introducing carboxyl | Succinic anhydride |  |  |  | 3.4 |  |
| group (parts) | Trimellitic anhydride |  |  |  |  | 11.3 |
| Dibutyltin dilaurate |  |  |  |  | 0.1 | 0.1 |
| Characteristics of resin | Appearance | opaque | opaque | opaque | opaque | opaque |
|  | Hydroxyl value (mg KOH/g) | 15.0 | 50.0 | 15.0 | 1.0 | 5.0 |
|  | Acid value (mg KOH/g) | 2.8 | 2.9 | 3.0 | 20.0 | 65.0 |
|  | Crystallization peak temperature (° C.) | 80 | 60 | 78 | 79 | 76 |
|  | Melt viscosity (Pa · s) | 0.5 | 0.2 | 0.5 | 0.6 | 0.3 |

Reference Example 15

Preparation of Glycidyl Group-Containing Acrylic Copolymer of the Present Invention In a reaction vessel equipped with a stirrer, a thermometer, a thermometer, a reflux condenser, and a nitrogen introducing inlet, 500 parts of xylene was charged and then heated to 135° C. in a nitrogen atmosphere.

A mixture of 350 parts of methyl methacrylate, 150 parts of glycidyl methacrylate, 3 parts of azobisisobutyronitrile and 20 parts of tert-butyl peroxyoctoate (abbreviated to

TABLE 3

|  |  | Examples | | | | |
|---|---|---|---|---|---|---|
| Items Name of powder coating | | 1 P-1 | 2 P-2 | 3 P-3 | 4 P-4 | 5 P-5 |
| Polyester resin | A-1 | 90 | 90 | 90 | 95 |  |
|  | A-2 |  |  |  |  | 90 |
|  | A-3 |  |  |  |  |  |
|  | A-4 |  |  |  |  |  |

TABLE 3-continued

|  |  | Examples | | | | |
|---|---|---|---|---|---|---|
| Items<br>Name of powder coating |  | 1<br>P-1 | 2<br>P-2 | 3<br>P-3 | 4<br>P-4 | 5<br>P-5 |
| Crystalline | B-1 | 10 |  |  | 5 | 10 |
| polyurethane resin | B-2 |  |  |  |  |  |
|  | B-3 |  | 10 |  |  |  |
|  | B-4 |  |  |  |  |  |
|  | B-5 |  |  | 10 |  |  |
| Block isocyanate | B-1530[1) | 14.2 | 14.2 | 14.6 | 14.6 | 18.7 |
| compound | BF-1540[2) |  |  |  |  |  |
| Acronal 4F[3) (Parts) |  | 0.5 | 0.5 | 0.5 | 0.5 | 0.5 |
| Benzoin (Parts) |  | 0.5 | 0.5 | 0.5 | 0.5 | 0.5 |
| Dibutyltin dilaurate (Parts) |  | 0.1 | 0.1 | 0.1 | 0.1 | 0.1 |
| CR-90[4) (Parts) |  | 50 | 50 | 50 | 50 | 50 |

TABLE 4

|  |  | Examples | |
|---|---|---|---|
| Items<br>Name of powder coating |  | 6<br>P-6 | 7<br>P-7 |
| Polyester resin | A-1 | 70 | 90 |
|  | A-2 |  |  |
|  | A-3 |  |  |
|  | A-4 |  |  |
| Crystalline | B-1 | 30 | 10 |
| polyurethane resin | B-2 |  |  |
|  | B-3 |  |  |
|  | B-4 |  |  |
|  | B-5 |  |  |
| Block isocyanate | B-1530[1) | 12.7 |  |
| compound | BF-1540[2) |  | 14.2 |
| Acronal 4F[3) (Parts) |  | 0.5 | 0.5 |
| Benzoin (Parts) |  | 0.5 | 0.5 |
| Dibutyltin dilaurate (Parts) |  | 0.1 | 0.1 |
| CR-90[4) (Parts) |  | 50 | 50 |

TABLE 5

|  |  | Comparative Examples | | | | | |
|---|---|---|---|---|---|---|---|
| Items<br>Name of powder coating |  | 1<br>P'-1 | 2<br>P'-2 | 3<br>P'-3 | 4<br>P'-4 | 5<br>P'-5 | 6<br>P'-6 |
| Polyester resin | A-1 | 100 |  | 100 |  |  |  |
|  | A-2 |  | 100 |  |  |  |  |
|  | A-3 |  |  |  | 100 | 80 |  |
|  | A-4 |  |  |  |  |  | 80 |
| Crystalline | B-1 |  |  |  |  | 20 | 20 |
| polyurethane | B-2 |  |  |  |  |  |  |
| resin | B-3 |  |  |  |  |  |  |
|  | B-4 |  |  |  |  |  |  |
|  | B-5 |  |  |  |  |  |  |
| Block isocyanate | B-1530[1) | 15 | 20 |  | 15 | 13.5 | 13.5 |
| compound | BF-1540[2) |  |  | 15 |  |  |  |
| Acronal 4F[3) (Parts) |  | 0.5 | 0.5 | 0.5 | 0.5 | 0.5 | 0.5 |
| Benzoin (Parts) |  | 0.5 | 0.5 | 0.5 | 0.5 | 0.5 | 0.5 |
| Dibutyltin dilaurate (Parts) |  | 0.1 | 0.1 | 0.1 | 0.1 | 0.1 | 0.1 |
| CR-90[4) (Parts) |  | 50 | 50 | 50 | 50 | 50 | 50 |

TABLE 6

|  |  | Examples | | | |
|---|---|---|---|---|---|
| Items<br>Name of powder coating |  | 8<br>P-8 | 9<br>P-9 | 10<br>P-10 | 11<br>P-11 |
| Polyester resin | A-5 | 90 |  |  | 95 |
|  | A-6 |  | 95 |  |  |

TABLE 6-continued

|  |  | Examples | | | |
|---|---|---|---|---|---|
| Items<br>Name of powder coating |  | 8<br>P-8 | 9<br>P-9 | 10<br>P-10 | 11<br>P-11 |
|  | A-7 |  |  | 90 |  |
| Crystalline | B-1 |  |  |  |  |
| polyurethane resin | B-2 |  | 5 |  |  |
|  | B-3 |  |  | 10 |  |
|  | B-4 | 10 |  |  |  |
|  | B-5 |  |  |  | 5 |
| Glycidyl group-<br>containing resin | C-1 | 15.2 | 19.7 | 26.8 | 17.2 |
| Block isocyanate | B-1530 | 9 | 10.7 | 9.0 |  |
| compound | BF-1540 |  |  |  | 12.5 |
| Acronal 4F[4) (Parts) |  | 0.5 | 0.5 | 0.5 | 0.5 |
| Benzoin (Parts) |  | 0.5 | 0.5 | 0.5 | 0.5 |
| Dibutyltin dilaurate |  | 0.1 | 0.1 | 0.1 | 0.1 |
| CR-90[5) (Parts) |  | 50 | 50 | 50 | 50 |

TABLE 7

|  |  | Comp.<br>Examples | |
|---|---|---|---|
| Items |  | 7 | 8 |
| Name of powder coating |  | P'-7 | P'-8 |
| Polyester resin | A-4 |  | 100 |
|  | A-5 |  |  |
|  | A-6 | 100 |  |
| Crystalline polyurethane resin | B-1 |  |  |
|  | B-2 |  |  |
|  | B-3 |  |  |
|  | B-4 |  |  |
|  | B-5 |  |  |
| Glycidyl group-containing resin | C-1 | 26.8 | 17.2 |
| Block isocyanate compound | B-1530 | 9 |  |
|  | BF-1540 |  | 15.2 |
| Acronal 4F[4) (Parts) |  | 0.5 | 0.5 |
| Benzoin (Parts) |  | 0.5 | 0.5 |
| Dibutyltin dilaurate |  | 0.1 | 0.1 |
| CR-90[5) (Parts) |  | 50 | 50 |

Notes for Table 3, Table 4, Table 5, Table 6 and Table 7:
[1)]B1530: blocked polyisocyanate compound prepared by blocking a nurate compound of isophorone diisocyanate with ε-caprolactam, using "VESTA-GON Bl350" manufactured by Degussa Hules of Germany
[2)]BF1540: blocked polyisocyanate compound prepared by self-blocking isophorone diisocyanate through a urethodione bond, using "VESTAGON B1540" manufactured by Degussa Hules of Germany
[3)]Acronal 4F: surface modifier manufactured by BASF of Germany
[4)]CR-90: rutile type titanium oxide "TIPAQUE CR-90" manufactured by ISIHARA SANGYO KAISHA, LTD.

Using the resulting powder coatings (P-1) to (P-11) and (P'-1) to (P'-8), various coating films shown below were made according to the following methods for forming coating films.

As the substrate used as the substance to be coated, a soft steel plate (0.8 mm in thickness) which was pre-treated using "Bondelight #3030" (the product name of a zinc phosphate treating agent manufactured by Nihon Parkerizing Ltd.) was used.

Coated articles having a coating film made of a powder coating (hereinafter abbreviated to "powder coating film") were obtained by electrostatic powder coating using each of the powder coatings (P-1) to (P-11) and (P'-1) to (P'-8) so that the film thickness after baking was 50 μm and baking was conducted at 200° C. for 20 minutes.

The gloss, smoothness, impact resistance, flexibility and accelerated weatherability of the powder coating film on the coated article thus obtained were evaluated. The results are summarized in Table 8 and Table 12.

TABLE 8

|  |  | Examples | | | | |
|---|---|---|---|---|---|---|
| Items | | 1 | 2 | 3 | 4 | 5 |
| Name of powder coating | | P-1 | P-2 | P-3 | P-4 | P-5 |
| Performance of coating film | Gloss (60°) | 93 | 91 | 92 | 90 | 91 |
| | Smoothness | ○ | ○ | ○ | ○ | ○ |
| | Impact resistance | 50< | 50< | 50< | 50< | 50< |
| | Flexibility | ○ | ○ | ○ | ○ | ○ |
| | Accelerated weatherability | 96 | 94 | 94 | 97 | 85 |

TABLE 9

|  |  | Examples | |
|---|---|---|---|
| Items | | 6 | 7 |
| Name of powder coating | | P-6 | P-7 |
| Performance of coating film | Gloss (60°) | 92 | 91 |
| | Smoothness | ○ | ○ |
| | Impact resistance | 50< | 50< |
| | Flexibility | ○ | ○ |
| | Accelerated weatherability | 94 | 93 |

TABLE 10

|  |  | Comparative Examples | | | | | |
|---|---|---|---|---|---|---|---|
| Items | | 1 | 2 | 3 | 4 | 5 | 6 |
| Name of powder coating | | P'-1 | P'-2 | P'-3 | P'-4 | P'-5 | P'-6 |
| Performance of coating film | Gloss (60°) | 87 | 88 | 84 | 93 | 96 | 96 |
| | Smoothness | Δ | Δ | Δ | Δ | ○ | ○ |
| | Impact resistance | 20 | 20 | 20 | 50< | 50< | 40 |
| | Flexibility | x | x | x | ○ | ○ | ○ |
| | Accelerated weatherability | 98 | 86 | 98 | 23 | 20 | 60 |

TABLE 11

|  |  | Examples | | | |
|---|---|---|---|---|---|
| Items | | 8 | 9 | 10 | 11 |
| Name of powder coating | | P-8 | P-9 | P-10 | P-11 |
| Performance of coating film | Gloss (60°) | 93 | 90 | 92 | 90 |
| | Smoothness | ○ | ○ | ○ | ○ |
| | Impact resistance | 50< | 50< | 50< | 50< |
| | Flexibility | ○ | ○ | ○ | ○ |
| | Accelerated weatherability | 94 | 91 | 90 | 90 |

TABLE 12

|  |  | Comparative Examples | |
|---|---|---|---|
| Items | | 7 | 8 |
| Name of powder coating | | P'-7 | P'-8 |
| Performance of coating film | Gloss (60°) | 86 | 85 |
| | Smoothness | Δ | Δ |
| | Impact resistance | 20 | 20 |
| | Flexibility | X | X |
| | Accelerated weatherability | 97 | 98 |

The evaluation was carried out using the following criteria.

Gloss: A 60° gloss value was measured using a gloss meter

Smoothness: Visually evaluated using the following criteria

○: very smooth surface

X: severe roughness observed

Impact resistance: Using a Du Pont impact testing device, determining the drop height (cm) at which cracking occurs when a punch having a diameter of ½ inch with a weight of 1 Kg was dropped onto the paint film.

Flexibility: It was determined whether cracking occurred at 25° C. when the coating film is folded at an angle of 900 with the coated surface facing upward ○: No cracking observed X: partial or complete cracking observed Accelerated weatherability: Using a sunshine weathermeter, an accelerated weathering test was carried out for 1000 hours, and then a 60° gloss value was measured and the retention (%) of initial gloss was measured.

What is claimed is:

1. A resin composition for powder coating, comprising a polyester resin (A) having a hydroxyl group or having a hydroxyl group and an acid group, isophthalic acid accounting for 50 mol % or more of a polycarboxylic acid units constituting the polyester resin; a crystalline polyurethane resin (B); and a curing agent (C-1) made of a compound having a functional group reactive with the hydroxyl group or a combination of a curing agent (C-1) made of a compound having a functional group reactive with the hydroxyl group and a curing agent (C-2) made of a compound having a functional group reactive with the acid group.

2. A resin composition for powder coating according to claim 1, wherein the polyester resin (A) has a hydroxyl value of 10 to 100.

3. A resin composition for powder coating according to claim 1, wherein the compound having a functional group reactive with the hydroxyl group is a blocked polyisocyanate compound.

4. A resin composition for powder coating according to claim 3, wherein the blocked polyisocyanate compound is a blocked polyisocyanate compound having a urethodione bond.

5. A resin composition for powder coating according to claim 1, wherein the crystalline polyurethane resin (B) has a crystallization peak temperature of 30 to 150° C.

6. A resin composition for powder coating according to claim 1, wherein the polyol unit constituting the crystalline polyurethane resin (B) is a straight-chain aliphatic diol having an even number of from 2 to 20 carbon atoms.

7. A resin composition for powder coating according to claim 1, wherein the polycarboxylic acid unit constituting the crystalline polyurethane resin (B) is a straight-chain aliphatic carboxylic acid having an even number of from 2 to 22 carbon atoms.

8. A resin composition for powder coating according to claim 1, wherein the crystalline polyurethane resin (B) has an acid group and/or a hydroxyl group.

9. A resin composition for powder coating according to claim 1, wherein the crystalline polyurethane resin (B) has an acid value of 5 to 100.

10. A resin composition for powder coating according to claim 1, wherein the crystalline polyurethane resin (B) has a hydroxyl value of 5 to 100.

11. A resin composition for powder coating according to claim 1, wherein a melt viscosity at 180° C. of the crystalline polyester polyurethane resin (B) is 10 Pa·s or less.

12. A powder coating comprising the resin composition for powder coating of any one of claims 1 to 11 and a surface modifier.

13. A coated article obtained by coating a substrate with the powder coating of claim 12 and curing the coating film by heating.

* * * * *